United States Patent
Pasanen et al.

(10) Patent No.: US 10,151,293 B2
(45) Date of Patent: Dec. 11, 2018

(54) ENERGY TRANSFER ARRANGEMENT OF A WAVE ENERGY RECOVERY APPARATUS

(71) Applicant: AW-Energy Oy, Vantaa (FI)

(72) Inventors: Sami Pasanen, Vantaa (FI); Jussi Åkerberg, Espoo (FI); Arvo Järvinen, Vantaa (FI)

(73) Assignee: AW-ENERGY OY, Vantaa (FI)

( * ) Notice: Subject to any disclaimer, the term of this patent is extended or adjusted under 35 U.S.C. 154(b) by 21 days.

(21) Appl. No.: 15/312,951

(22) PCT Filed: May 22, 2014

(86) PCT No.: PCT/FI2014/050397
§ 371 (c)(1),
(2) Date: Nov. 21, 2016

(87) PCT Pub. No.: WO2015/177400
PCT Pub. Date: Nov. 26, 2015

(65) Prior Publication Data
US 2017/0175700 A1 Jun. 22, 2017

(51) Int. Cl.
*F03B 13/18* (2006.01)
*F16H 19/04* (2006.01)
*F16H 31/00* (2006.01)

(52) U.S. Cl.
CPC ...... *F03B 13/182* (2013.01); *F05B 2220/706* (2013.01); *F05B 2230/70* (2013.01); *F05B 2260/406* (2013.01); *F05B 2260/4031* (2013.01); *F16H 19/04* (2013.01); *F16H 31/001* (2013.01); *Y02E 10/38* (2013.01)

(58) Field of Classification Search
CPC ...... F03B 13/1815; F03B 13/12; F03B 13/16; F03B 13/18; F03B 13/181
See application file for complete search history.

(56) References Cited

U.S. PATENT DOCUMENTS

| | | | |
|---|---|---|---|
| 1,555,487 A | 9/1925 | Sauer et al. | |
| 3,668,412 A * | 6/1972 | Vrana | F03B 13/262 290/53 |
| 3,959,663 A * | 5/1976 | Rusby | F03B 13/262 290/53 |
| 3,964,264 A * | 6/1976 | Tornabene | F03B 13/186 175/5 |

(Continued)

FOREIGN PATENT DOCUMENTS

| | | |
|---|---|---|
| WO | WO 2007/072016 A1 | 6/2007 |
| WO | WO 2013/041756 A1 | 3/2013 |

*Primary Examiner* — Mark Laurenzi
*Assistant Examiner* — Shafiq Mian
(74) *Attorney, Agent, or Firm* — Birch, Stewart, Kolasch & Birch, LLP

(57) ABSTRACT

This invention relates to an energy transfer arrangement of a wave energy recovery apparatus comprising at least a base, a reciprocating panel, supporting legs and a pivot shaft for the reciprocating panel, and a driving and power-take-off arrangement equipped with an actuating mechanism and one or more power-take-off units to convert kinetic energy of waves or tidal currents to another type of energy, each PTO unit comprising a power transmission mechanism. The actuating mechanism is arranged to transfer the reciprocating motion of the panel mechanically to a linear motion of the power transmission mechanism of each PTO unit.

19 Claims, 6 Drawing Sheets

(56) References Cited

U.S. PATENT DOCUMENTS

Figure 1:
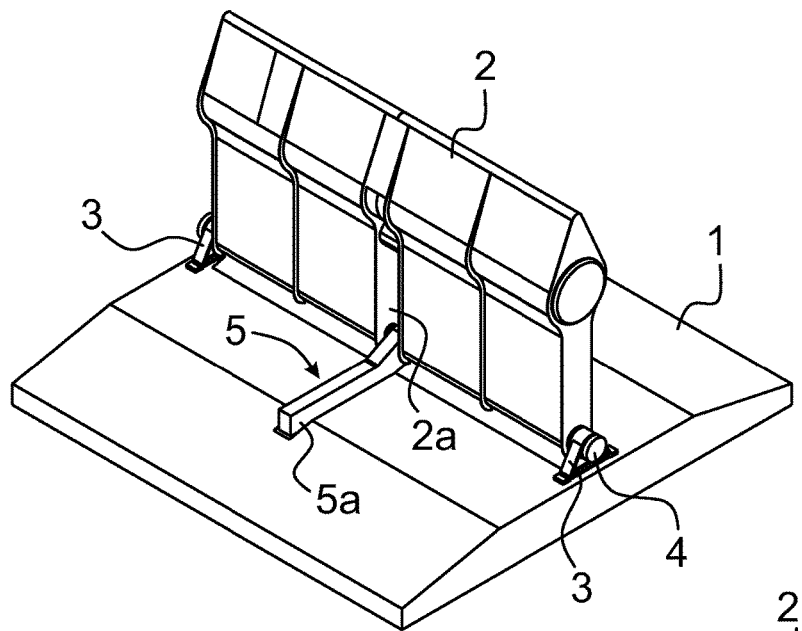

| | | | | |
|---|---|---|---|---|
| 4,108,578 A | * | 8/1978 | Corey | F03B 13/186 |
| | | | | 417/331 |
| 4,371,788 A | | 2/1983 | Smith, Jr. | |
| 4,843,249 A | * | 6/1989 | Bussiere | F03B 13/183 |
| | | | | 290/42 |
| 2007/0130929 A1 | * | 6/2007 | Khan | F03B 13/185 |
| | | | | 60/398 |
| 2008/0016863 A1 | * | 1/2008 | Tai | F03B 13/186 |
| | | | | 60/497 |
| 2009/0072540 A1 | * | 3/2009 | McCague | F03B 13/186 |
| | | | | 290/53 |
| 2013/0140943 A1 | * | 6/2013 | Jean | F03B 11/00 |
| | | | | 310/300 |
| 2015/0204304 A1 | * | 7/2015 | Sidenmark | F03B 13/16 |
| | | | | 60/398 |

\* cited by examiner

ENERGY TRANSFER ARRANGEMENT OF A WAVE ENERGY RECOVERY APPARATUS

The present invention relates to an energy transfer arrangement of a wave energy recovery apparatus as defined in the preamble of claim 1.

The energy transfer arrangement according to the invention is suited very well for instance to be used in connection with a panel or flap or essentially plate-like wing element, later called shorter only as panels, hinged with its lower edge to make a reciprocating movement caused by wave energy or tidal energy of seawater. The wave energy or tidal energy collected is further converted underwater with a conversion unit for instance to electric energy. For the sake of simplicity, only the term wave energy is later mentioned when both the wave energy and the tidal energy of seawater are meant.

According to prior art there are various types of wave energy recovery systems where the arrangements include a base and, for instance, one or more panels pivotally connected to the base to make a reciprocating or oscillating movement about a rotation axis or pivot axis in response to wave forces or tidal forces. The oscillating movement is then converted for example to electric energy with the help of a power-take-off (PTO) unit equipped with a power-take-off (PTO) machinery comprising a generator or alike.

Commonly a PTO unit of prior art wave energy conversion devices is connected more or less permanently to the reciprocating panel of the wave conversion device as is shown for example in the international patent publication No. WO2006/100436 A1. For instance FIG. 6a of the publication shows a device, which has a panel attached by pivot shafts to a base portion, and a driving rod pivotally attached to each side of the panel. Each driving rod connects to a piston inside a hydraulic cylinder, which is pivotally attached to the base portion. In use, the panel oscillates in response to wave action, and the driving rods are driven to cause hydraulic fluid in the hydraulic cylinders to be pressurized by the action of the pistons moved by the driving rods.

Because of massive forces and torques on the pivot shaft, the driving and PTO mechanisms used must be usually hydraulic. However, the reciprocating panel causes still huge reciprocating forces to the driving mechanisms. These reciprocating forces cause extreme fatigue stress to the structure, which leads easily the various fatigue breakdowns. For these reasons also hydraulic driving and PTO arrangements used must be big and robust, and then they are also expensive.

Another problem with hydraulic driving and PTO arrangements according to prior art is that they require a lot of maintenance and/or repairs, and their lifetime is considerably short. Also the maintenance and/or repairs of the driving and PTO assemblies according to prior art can be time consuming, expensive and even dangerous. Typically, the maintenance and/or repairs must be performed at the production site in-situ, which means that all the work must be done on the bottom of the sea. Thus, for instance, divers are needed to perform the job. The job is slow, difficult and expensive, and can also be dangerous. In addition, since the maintenance mostly must be conducted underwater, the internal components that are usually protected from the water may undesirably get wet during the maintenance or work. Also, the wave energy conversion devices according to prior art must be made inactive during maintenance and repairs. This causes unnecessary shutdown times during which wave energy cannot be recovered.

The maintenance and repairs problem mentioned above has been tried to solve by a solution shown in the international patent publication No. WO2011/026173 A1. This WO publication shows a structure where one or more modular energy transfer mechanism is connected with a pivot shaft of the wave energy recovery apparatus. The installation and removal of the modular energy transfer mechanism can be done when the panel portion of the apparatus has been lowered into its flat "survival mode" configuration as mentioned in the WO publication. This solution has several disadvantages. Firstly the modular energy transfer mechanisms are connected directly onto the pivot shaft that causes massive forces and torques. Consequently the structure of modular energy transfer mechanism is extremely prone to various fatigue breakdowns and therefore the structure of energy transfer mechanism according to the WO publication must be big and robust, and is therefore also expensive. Another problem is the installation and removal of the modular energy transfer mechanisms. It can be easy and fast only after the panel portion of the apparatus has been lowered into its flat "survival mode" configuration, but that task is extremely difficult, if not almost impossible in prevailing ocean conditions where waves never stop moving.

The object of the present invention is to eliminate the drawbacks described above and to achieve a reliable, compact, economical and efficient wave energy conversion apparatus in order to be able to capture a maximum amount of available wave or tidal energy. Another object of the present invention is to make the installation, maintenance and repairs of the wave energy conversion apparatus easy and fast, and to make it possible to easily disconnect/connect the PTO arrangements from/to the other structure as one package without disturbing the functions of the other structure. Yet one object of the present invention is also to achieve an apparatus that is simple in its structure, durable and stands for long without fatigue breakdowns the massive forces caused by the reciprocating motion. The wave energy conversion apparatus according to the invention is characterized by what is presented in the characterization part of claim 1. Other embodiments of the invention are characterized by what is presented in the other claims.

The solution of the invention has the advantage that its structure is simple and economical and very durable enduring typical fatigue stresses in its neighborhood very well. Also many other structural advantages are achieved because the energy is captured only with a linear pushing motion. That saves among other things the structures of the driving and PTO arrangements. One advantage is that the arrangement according to the invention has not many moving components. In that case the arrangement works very reliably and just as it has been designed to work. One significant advantage is that there is no need to stop the reciprocating motion of the panel when the PTO unit is removed from the energy recovery arrangement for maintenance or repair purposes, or installed back after the maintenance or repairs. Also one advantage is that the PTO unit is a separate modular structure that is easy to lock motionless and then remove as one package and lift to the surface of the sea for the maintenance, change or repairs. Yet one more advantage is that the arrangement can be easily arranged to a safe position that protects the structure of the wave energy recovery apparatus against stormy conditions. That makes also the dimensioning in the planning phase easier and simpler.

Figure 2A:
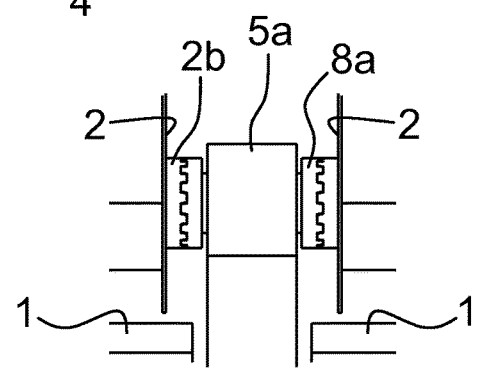
Figure 2:
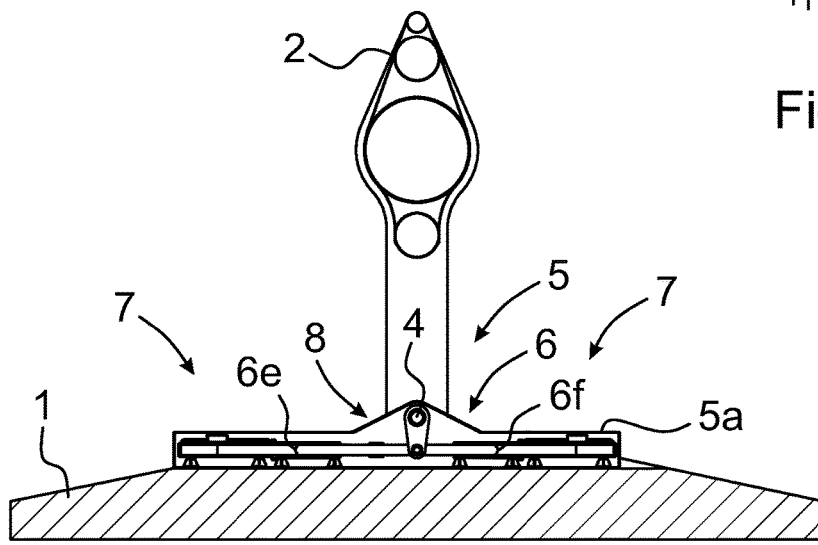
Figure 3:
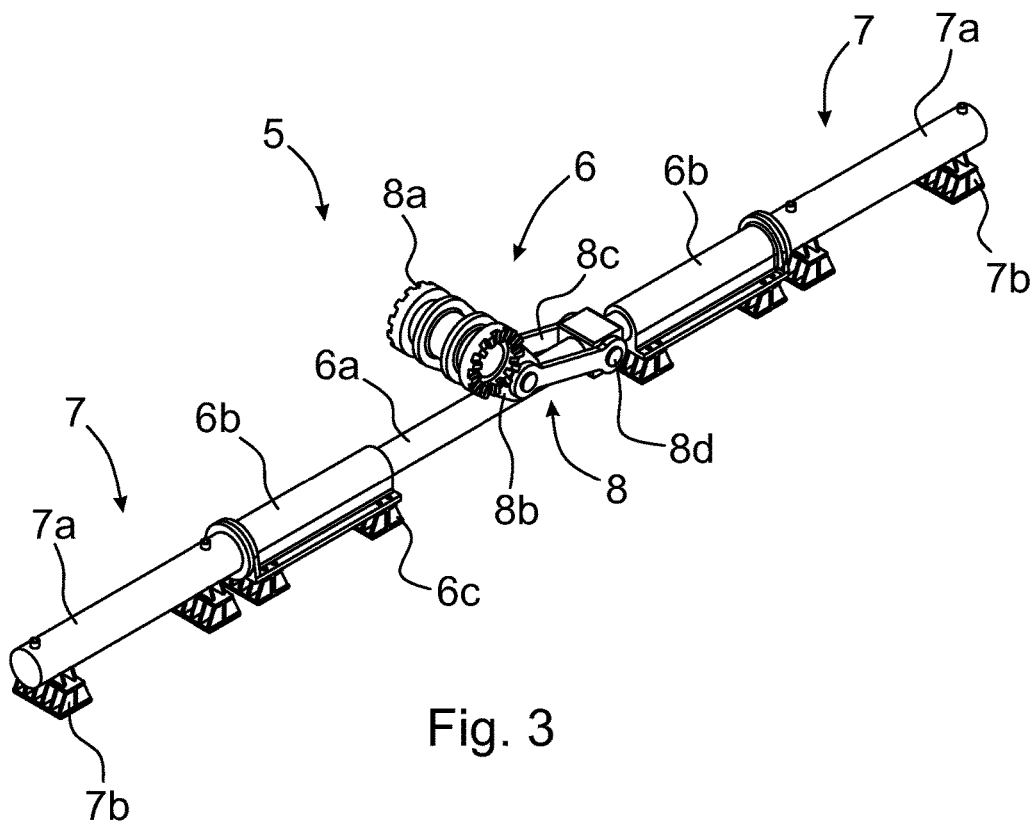
Figure 4:
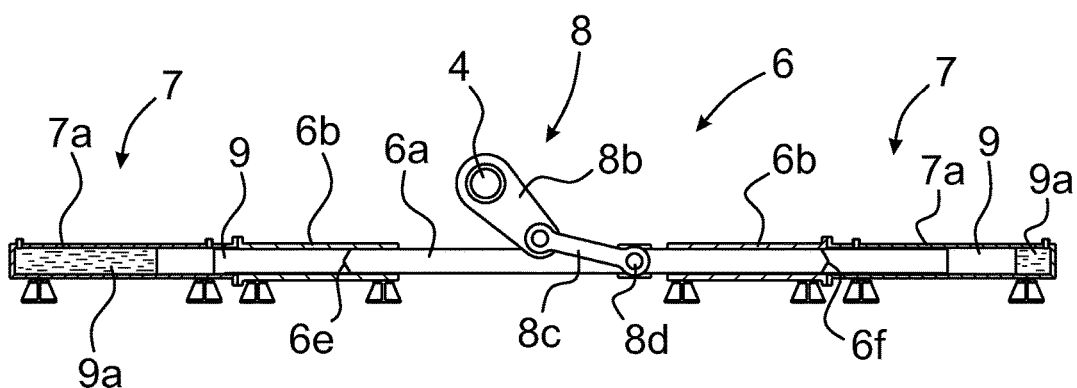
Figure 5:
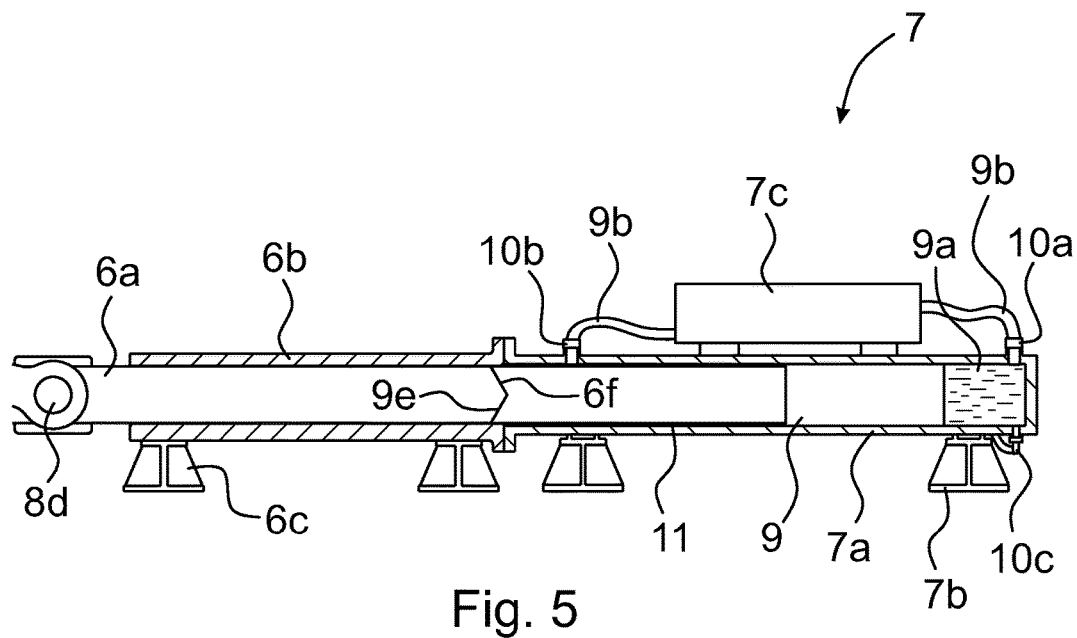
Figure 6:
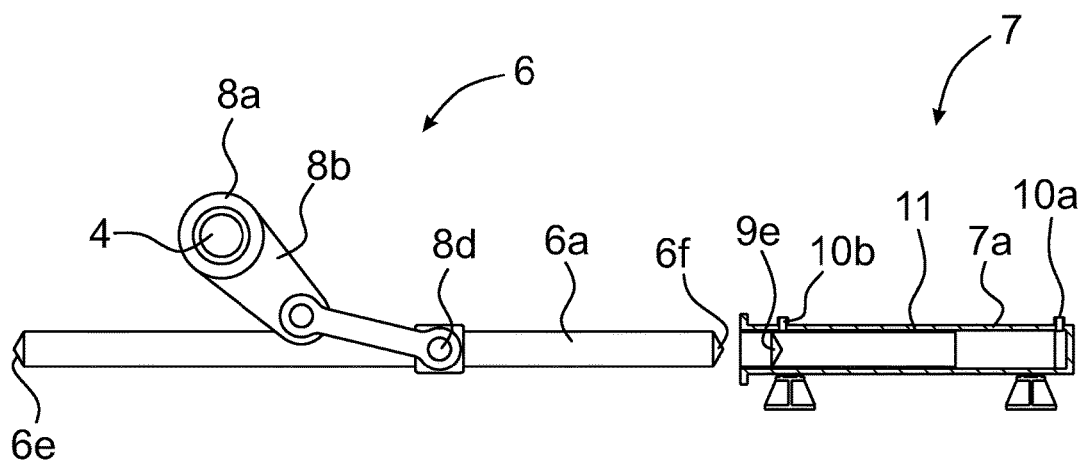
Figure 7:
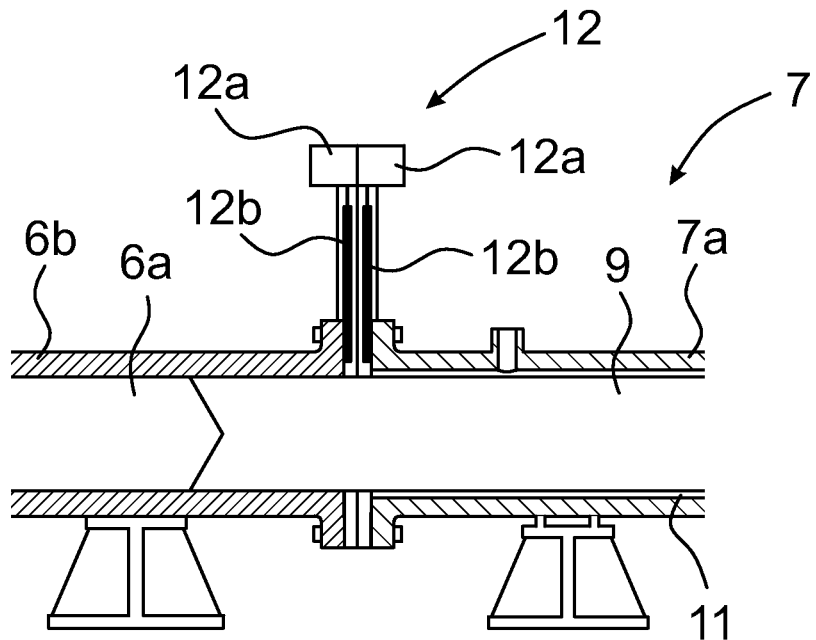
Figure 8:
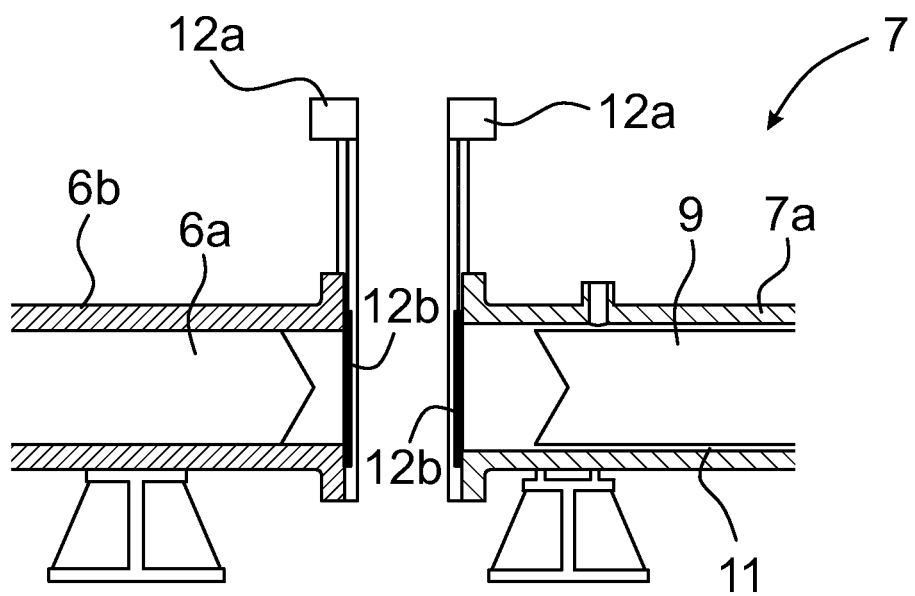
Figure 9:
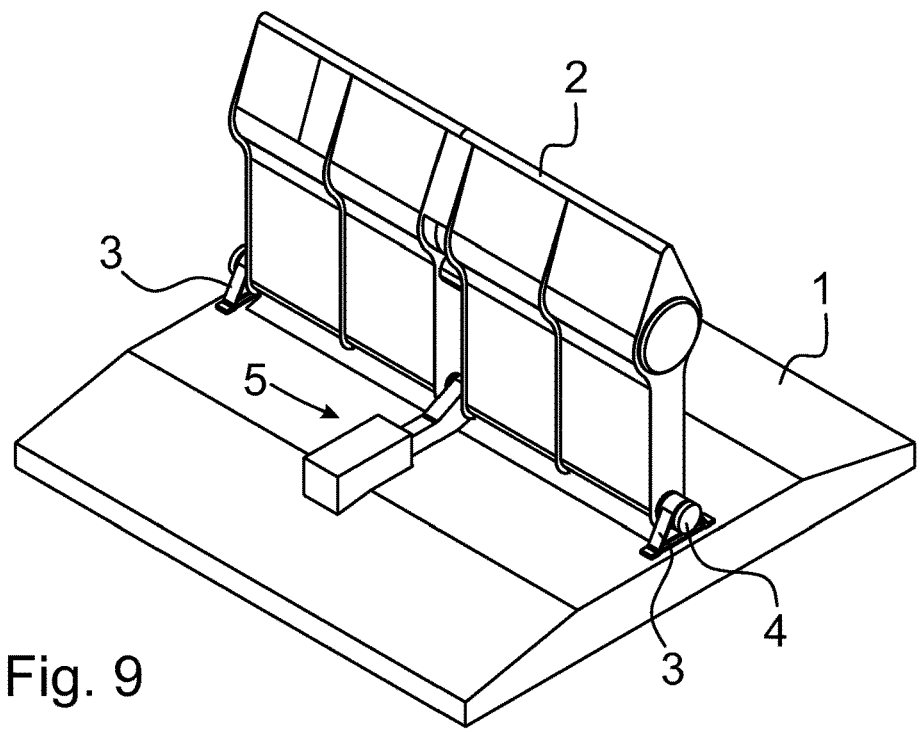
Figure 10:
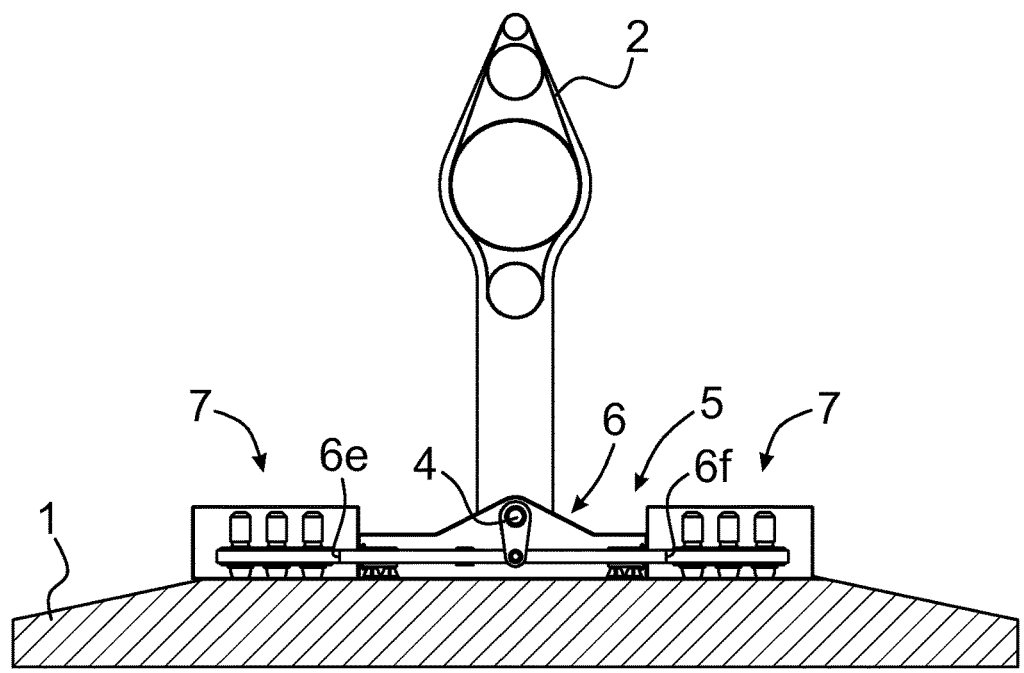
Figure 11:
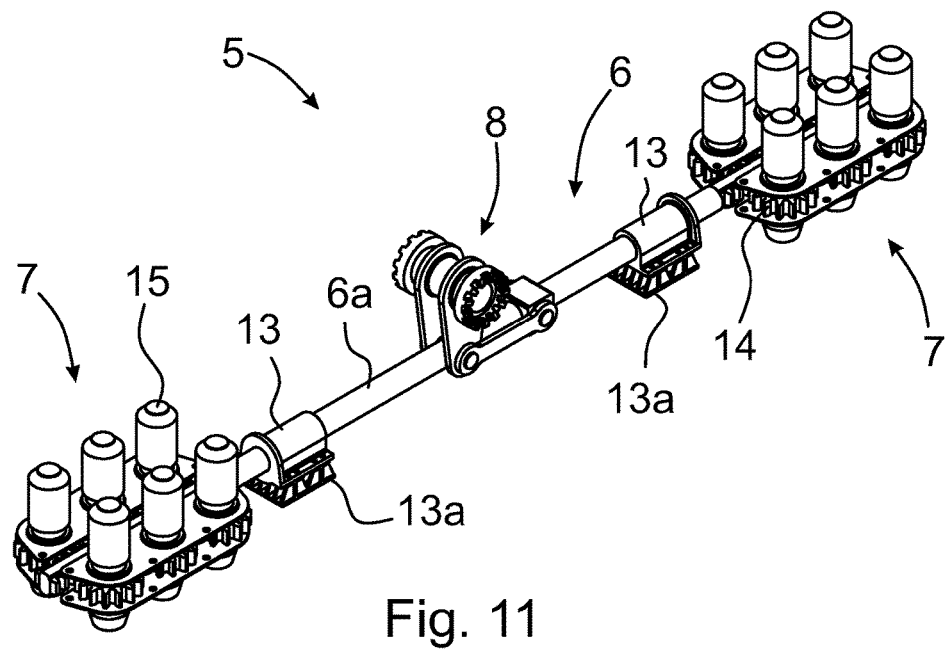
Figure 12:
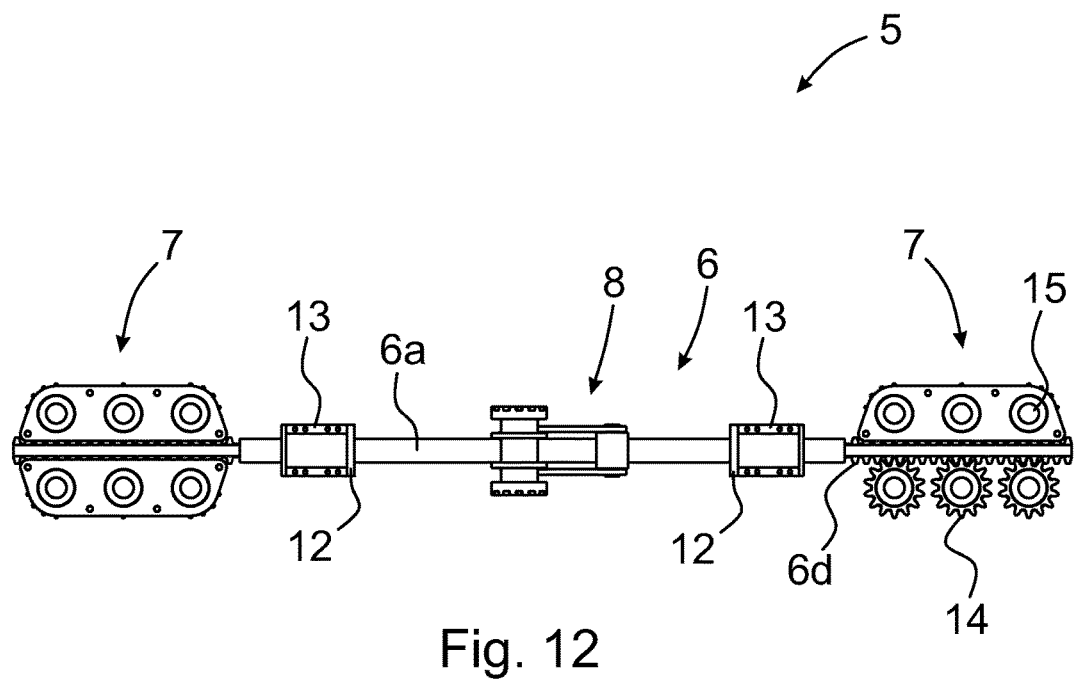

In the following, the invention will be described in detail by the aid of examples by referring to the attached simplified and diagrammatic drawings, wherein FIG. 1 presents a simplified oblique top view of a wave energy recovery apparatus according to the invention, FIG. 2 presents in a side view, partially cross-sectioned and in a simplified and diagrammatic way a wave energy recovery apparatus according to the invention, FIG. 2a presents in a front view and in a simplified and diagrammatic way a tooth coupling assembly between the halves of the reciprocating panel of wave energy recovery according to the invention, FIG. 3 presents a simplified oblique top view of a driving and power-take-off unit of the wave energy recovery apparatus according to the invention, FIG. 4 presents in a side view, partially cross-sectioned and in a simplified and diagrammatic way the driving and power-take-off unit of the wave energy recovery apparatus according to the invention, FIG. 5 presents in an enlarged side view, cross-sectioned, and in a simplified and diagrammatic way one end of the driving and power-take-off arrangement of the wave energy recovery apparatus according to the invention, FIG. 6 presents in a side view, cross-sectioned, and in a simplified and diagrammatic way one end of the driving and power-take-off arrangement of the wave energy recovery apparatus according to the invention the power-take-off unit separated from the driving unit, FIG. 7 presents in an enlarged side view, cross-sectioned, and in a simplified and diagrammatic way a connection between the driving arrangement and the power-take-off arrangement of the wave energy recovery apparatus according to the invention when the power-take-off arrangement is fastened to the driving arrangement, FIG. 8 presents in an enlarged side view, cross-sectioned, and in a simplified and diagrammatic way a connection between the driving arrangement and the power-take-off arrangement of the wave energy recovery apparatus according to the invention when the power-take-off arrangement is separated from the driving arrangement, FIG. 9 presents a simplified oblique top view of another embodiment of the wave energy recovery apparatus according to the invention, FIG. 10 presents in a side view, partially cross-sectioned and in a simplified and diagrammatic way a wave energy recovery apparatus according to FIG. 9, FIG. 11 presents a simplified oblique top view of a driving and power-take-off arrangement of the wave energy recovery apparatus according to FIG. 9, and FIG. 12 presents in a top view, partially cross-sectioned and in a simplified and diagrammatic way the driving and power-take-off arrangement of the wave energy recovery apparatus according to FIG. 9.

The basic idea of the present invention is to connect the power-take-off unit or PTO unit and the driving unit together as simply as possible and in a way that makes the removal and installation of the PTO unit easy and fast, and that also makes it possible to protect the structures of the wave energy recovery apparatus easily and fast against stormy conditions.

FIGS. 1 and 2 present a wave energy recovery apparatus according to the invention in two different views. The wave energy recovery apparatus comprises at least a base 1, a panel 2 reciprocating about its pivot shaft 4, a driving and power-take-off (PTO) arrangement 5 having an actuating mechanism 6 and one or more hydraulic PTO units 7. The actuating mechanism 6 is arranged to transfer a reciprocating motion of the panel 2 mechanically to a linear motion of a piston that acts in this embodiment of the invention as a part of the power transmission mechanism of the PTO units 7.

The reciprocating panel 2 oscillates on the base 1 back and forth with the movement of seawater for recovering kinetic energy like wave energy of seawater. The panel 2 comprises two parallel halves with a vertical gap 2a extending upwards from the lower edge of the panel 2 in the middle of the panel 2 between the two halves of the panel 2. The upper part of the panel 2 is unbroken without the gap 2a. At the production site the base 1 is mounted onto the bottom of the sea. On the base 1 there are advantageously two or possibly more supporting legs 3 that are fastened onto the base 1 so that at least one supporting leg 3 is situated at each side of the panel 2. At its upper end each supporting leg 3 supports an essentially horizontal, back and forth rotating pivot shaft 4 on which the two halves of the panel 2 are mounted at their lower edges so that the panel 2 can make a reciprocating motion along the movement of the seawater, for instance along the movement of waves. The pivot shaft 4 can be a common shaft reaching from the first side of the panel 2 to the second side of the panel 2, or it can also be formed from several separate parts, for instance from three separate parts so that one part is at each outer side of the panel 2 and one common shaft part to both the halves of the panel 2 is horizontally in the middle of the panel 2. The panel 2 and the pivot shaft 4 rotate back and forth together simultaneously and at the same speed of rotation.

The driving and PTO arrangement 5 has been placed into the gap 2a of the two lower halves of the panel 2 and fastened onto the base 1. The driving and PTO arrangement 5 is situated symmetrically in relation to the pivot shaft 4 of the panel 2 in the direction of the width of the panel 2, and also in the direction of the reciprocating motion of the panel 2. In that kind of an arrangement there are one or more mutually symmetrically placed PTO units 7 at either side of the panel 2 in the direction of the reciprocating motion of the panel 2. Equally, the PTO units 7 can also be placed in many other ways. For instance, all the PTO units 7 can be situated at the same side of the panel 2 in the direction of the reciprocating motion of the panel 2. Then the PTO units 7 can be situated either parallel to each other or one upon the other. The driving and PTO arrangement 5 is protected with a sealed protection cover 5a against seawater.

The actuating mechanism 6 having a rectilinear actuating rod 6a is connected about its middle part through a lever mechanism 8 to a lower part of the panel 2 and arranged to make reciprocating linear motion together with the panel 2. The actuating rod 6a has two ends that act as the first pusher end 6e and the second pusher end 6f. The pusher ends 6e, 6f are free ends so that they are not fastened or otherwise anchored or fixed to any other part of the arrangement. The pusher ends 6e, 6f are only arranged to push the power transmission mechanism of the PTO units 7 in turns so that when the first pusher end 6e is pushing the power transmission mechanism of the first PTO unit 7 the second pusher end 6f is returning from pushing the power transmission mechanism of the second PTO unit 7. The power transmission mechanism of the PTO units 7 in this embodiment is a piston 9 in a hydraulic cylinder 7a. By this way the actuating mechanism 6 is arranged to transfer the reciprocating motion of the panel 2 mechanically to the linear motion of the piston 9 of the hydraulic power-take-off units 7 of this example embodiment.

FIG. 2a presents a tooth coupling assembly between the two halves of the reciprocating panel 2. The actuating mechanism 6 comprises the lever mechanism 8 with a pair of mutually similar circular coupling elements 8a that act as toothed couplings and have a central hole and a rim with a toothed outer side. Each coupling element 8a is coupled in the gap 2a to a corresponding circular toothed coupling element 2b that has been fastened onto the inner end surface of each half of the panel 2 so that the coupling element 2b makes a reciprocating rotary motion along with the panel 2 about the pivot shaft 4 that is inserted through the central hole of the toothed coupling elements 2b and 8a.

FIGS. 3 and 4 present more precisely the driving and PTO arrangement 5 of the wave energy recovery apparatus according to the invention. As mentioned above the driving and PTO arrangement 5 comprises the actuating mechanism 6 and one or more hydraulic PTO units 7, in this example there are two PTO units 7 that are mutually similar and placed opposite to each other at the different sides of the panel 2 in the direction of the reciprocating motion of the panel 2. In addition to the lever mechanism 8 the actuating mechanism 6 comprises the rectilinear actuating rod 6a, which can be for instance a steel pipe with a strong wall. In FIGS. 3 and 4 only a hydraulic cylinder 7a and a piston 9 of each PTO unit 7 are shown. The other components of the PTO units 7 have been omitted for the sake of clarity.

The pair of mutually similar circular coupling elements 8a is fastened to the first end of a pair of the first lever arms 8b that are pivoted at their second end to the first end of a pair of the second lever arms 8c that are further pivoted at their second end to the actuating rod 6a through a joint pin 8d that is constantly fastened to the actuating rod 6a. As mentioned above each circular coupling element 8a acts as a toothed coupling and has a central hole and a rim with a toothed outer side. The pivot shaft 4 is inserted through the central hole and the toothed outer side is connected in the gap 2a with a corresponding coupling element on the inner end surface of the panel 2. Thus, the coupling elements 8a make a reciprocating rotary motion along with the panel 2 about the pivot shaft 4, and at the same time the levers 8b and 8c force the actuating rod 6a to move rectilinearly back and forth guided by cylinders 6b.

By this way the PTO units 7 are mechanically separated from the actuating mechanism 6 and from both the pivot shaft 4 and the panel 2. In addition the actuating rod 6a of the actuating mechanism 6 has not directly been connected to the pivot shaft 4 or to the panel 2 but the connection is implemented through the lever mechanism 8 with two successive levers 8b and 8c having a pivot joint between them. According to the arrangement of the invention the actuating mechanism 6 is arranged to act as a separate intermediate mechanism between the panel 2 and the PTO units 7. That makes an easy and fast removal and installation of the PTO units 7 possible.

Each end 6e, 6f of the actuating rod 6a is closed into the guiding cylinder 6b that is fastened to the base 1 through support pedestals 6c. Both the ends 6e, 6f of the actuating rod 6a are arranged to slide guided back and forth inside the guiding cylinders 6b. The length of the guiding cylinders 6b is so dimensioned that the ends 6e, 6f of the actuating rod 6a keep always inside the guiding cylinders 6b during the reciprocating linear motion of the actuating rod 6a. Thus, the length of the guiding cylinder 6b is greater than the reciprocating linear motion of the actuating rod 6a. This makes the removal and installation of the PTO units 7 possible without stopping the reciprocating motion of the panel 2. This also makes the easy storm protection possible by only locking the piston 9 inside its hydraulic cylinder 7a and closing the ends of the cylinders 6b and 7a. Then the panel 2 can freely follow the motion of the waves and the actuating rod 6a makes freely linear reciprocating motion in the cylinders 6b without causing any forces to other structures of the arrangement.

The hydraulic cylinder 7a of the hydraulic PTO unit 7 is connected water tightly and co-axially to the free end of each guiding cylinder 6b. The hydraulic cylinders 7a are fastened to the base 1 through support pedestals 7b. The cylindrical piston 9 is placed inside the hydraulic cylinder 7a so that between the closed end or the second end of the hydraulic cylinder 7a and the second end of the piston 9 there is a sealed pressure space 9a that is filled with hydraulic fluid that is circulated in the hydraulic circuit of the hydraulic PTO unit 7 for converting the captured wave energy for instance to electric energy. The cylindrical piston 9 is arranged to move inwards toward the closed end of the hydraulic cylinder 7a by the rectilinear thrust caused by the actuating rod 6a, and back outwards, following the return motion of the actuating rod 6a, by a pressure prevailing in the hydraulic circuit of the PTO unit 7 and returned the pressure space 9a through a connector 10c. When the piston 9 is moving inwards it causes a pressure to the hydraulic circuit 9b of the hydraulic PTO unit 7, which pressure rotates for instance electric generators to produce electric energy.

FIGS. 5-6 present in an enlarged side view, cross-sectioned, and in a simplified and diagrammatic way one end of the driving and PTO arrangement 5 of the wave energy recovery apparatus according to the invention. In the situation of FIG. 5 the actuating rod 6a is at its utmost position to push the piston 9 inside the hydraulic cylinder 7a towards the closed end of the cylinder 7a. The most of the hydraulic fluid in the space 9a has been pressed to the hydraulic circuit 9b of the hydraulic PTO unit 7 through a connector 10a, and the first end 9e of the piston 9 is still inside the guiding cylinder 6b strongly in touch with the second pusher end 6f of the actuating rod 6a. The second pusher end 6f of the actuating rod 6a and the first end 9e of the piston 9 are advantageously shaped mutually so that the pushing force of the actuating rod 6a is directed as centralized and rectilinearly as possible to the piston 9 without causing any lateral forces.

Thus, for instance the shape of the second pusher end 6f of the actuating rod 6a is in the longitudinal direction of the actuating rod (6a) outwardly conical or spherical and correspondingly the first end 9e of the piston 9 is inwardly conical or spherical, or vice versa. The same conical or spherical forms apply also to the first end of the driving and power-take-off arrangement 5 with the pusher end 6e of the actuating rod 6a. In FIG. 5 also an energy conversion machinery 7c of the PTO unit 7 is shown. The energy conversion machinery 7c comprises for instance a hydraulic motor, one or more generators and a control unit. The hydraulic motor receives its driving force from the hydraulic circuit 9b through the connector 10a and rotates the generators to produce electric energy.

When the hydraulic cylinder 7a is in function the first end 9e of the piston 9 is always inside the guiding cylinder 6b. However, in order to remove the PTO unit 7 the hydraulic cylinder 7a must be separated from the guiding cylinder 6b. Before the removal the first end 9e of the piston 9 is taken away from the guiding cylinder 6b and the piston 9 is pressed towards the closed end of the cylinder 7a by a pressure of the hydraulic circuit 9b of the hydraulic PTO unit 7 through a connector 10b from where the hydraulic fluid runs to a hollow cylindrical space 11 between the inner surface of the cylinder 7a and the outer surface of the first section of the piston 9 which first section of the piston 9 is smaller in its diameter than the second section of the piston 9 closer to the closed end of the cylinder 7a. In this way the piston 9 can be locked in its entirety inside the cylinder 7a, and after that the cylinder 7a can be easily and safely separated from the guiding cylinder 6b. FIG. 6 presents the situation where the hydraulic cylinder 7a of the PTO unit 7 has been separated from the guiding cylinder 6b and the PTO unit 7 is ready to be lifted to the surface of the water.

However, before the removal of the hydraulic cylinder 7a both the free end of the hydraulic cylinder 7a and the free end of the guiding cylinder 6b must be closed and sealed against seawater. For the sake of clarity the closing and sealing mechanism 12 is not shown in FIGS. 1-6. One embodiment of the closing and sealing mechanism 12 is shown in FIGS. 7 and 8. In this embodiment the closing and sealing mechanism 12 is placed between the free end of the hydraulic cylinder 7a and the free end of the guiding cylinder 6b. The closing and sealing mechanism 12 comprises for instance two gate valves that are installed into the opening of both the cylinders 6b and 7a. Each gate valve comprises for instance a manual or electric actuator 12a and a gate 12b that is moved by the actuator 12a either to close the openings of the cylinders 6b and 7a when the hydraulic cylinder 7a has to be removed, or to open the openings of the cylinders 6b and 7a for activating the wave energy recovery arrangement. In FIG. 7 the gate valves are open and the gates 12a have been moved away from the front of the openings of the cylinders 6b and 7a, and the first end 9e of the piston 9 is inside the guiding cylinder 6b. In FIG. 8 the gate valves are closed and the gates 12a have been moved to the front of the openings of the cylinders 6b and 7a, and the first end 9e of the piston 9 is inside the hydraulic cylinder 7a of the PTO unit 7.

The closing and sealing mechanism 12 of the cylinder ends can also be different from what is presented above. Instead of gate valves, also spherical valves can be used, or the closing and sealing mechanism 12 can comprise a first separate closing and sealing part in the cylinder 6b in front of the pusher end 6e, 6f of the actuating rod 6a, and a second separate closing and sealing part in the cylinder 7a in front of the first end 9e of the piston 9. The closing and sealing parts can be short and cylindrical and their ends can be outwardly and inwardly conical or spherical to match to the pusher ends 6e, 6f of the actuating rod 6a and to the first end of the piston 9. In addition the closing and sealing parts comprise a locking mechanism, for instance a hydraulic locking mechanism to lock the closing and sealing parts at the opening end of the cylinders 6b and 7a. During the working phase the closing and sealing parts make reciprocating motion inside the cylinders 6b and 7a closed to each other between the pusher ends 6e, 6f of the actuating rod 6a and the first end of the pistons 9.

FIGS. 9-12 present another advantageous embodiment of the wave energy recovery apparatus according to the invention. The wave energy recovery apparatus according to the embodiment comprises at least a base 1, a panel 2 reciprocating about its pivot shaft 4, a driving and power-take-off (PTO) arrangement 5 having an actuating mechanism 6 and one or more power-take-off units (PTO) 7 to convert the captured wave energy to electric energy. The actuating mechanism 6 is arranged to transfer the reciprocating motion of the panel 2 mechanically to a linear motion that rotates the generators of the PTO units 7. The structure and functions of the wave energy recovery apparatus according to this embodiment of the invention are basically the same as described above in connection with the example embodiment of FIGS. 1 and 2, but a part of the power transmission mechanism and the energy conversion machinery 7c of the PTO unit 7 are now different.

The actuating mechanism 6 having a rectilinear actuating rod 6a is fastened through the lever mechanism 8 to the lower part of the panel 2 and arranged to make reciprocating linear motion together with the panel 2. The linear motion of the actuating rod 6a has been arranged to push linearly the power transmission mechanism 6d of the PTO unit 7, which power transmission mechanism in this embodiment is a pinion rack. By this way the actuating mechanism 6 is arranged to transfer the reciprocating motion of the panel 2 mechanically to the linear motion of the pinion rack 6d of the PTO unit 7, which pinion rack 6d is arranged to rotate the generators 15 of the PTO unit 7 through gear wheels 14 with which the pinion rack 6d is arranged to be meshing. When the pinion rack 6d is moving linearly to one direction the gear wheels 14 rotate to one direction and when the pinion rack 6d is moving linearly to an opposite direction the gear wheels 14 rotate to the opposite direction.

The arrangement according the embodiment comprises a return mechanism which is arranged to make the pinion rack 6d to follow the pusher end 6e, 6f of the actuating rod 6a when the actuating rod 6a falls back from its utmost position.

The return mechanism can be for instance a mechanical or hydraulic spring mechanism that pushes the first end of the pinion rack 6d towards the pusher end 6e, 6f of the actuating rod 6a, or the return mechanism can be for instance an electric mechanism that pushes the first end of the pinion rack 6d towards the pusher end 6e, 6f of the actuating rod 6a during the return motion of the actuating rod 6a. In case of the electric mechanism one of generators 15 can be used as an electric motor pushing the pinion rack 6d towards the pusher end 6e, 6f of the actuating rod 6a, and the rest of the generators of one PTO unit 7 rotate freely without resisting the return motion of the pinion rack 6d. Electric power for the return pushing of the pinion rack 6d is taken from the other PTO unit 7 that is currently generating electric energy.

The pusher ends 6e, 6f are arranged to push the power transmission mechanism 6d of the PTO units 7 in turns so that when the first pusher end 6e is pushing the pinion rack 6d of the first PTO unit 7 the second pusher end 6f is returning from pushing the pinion rack 6d of the second PTO unit 7, and the pinion rack 6d of the second PTO unit 7 follows the second pusher end 6f rotating at the same time the gear wheels 14 of the PTO unit 7, which gear wheels are disconnected from rotating the generators 15 for instance by a freewheel clutch. So, the groups of generators 15 of each PTO unit 7 work in turns such that electric is generated substantially continuously; when the first pusher end 6e is pushing the pinion rack 6d the first PTO unit 7 is generating electric energy, and when the second pusher end 6f is pushing the pinion rack 6d the second PTO unit 7 is generating electric energy.

The transmission ratio between the rotary motion of the gear wheels 14 and the generators 15 has been arranged so that the generators 15 rotate at an appropriate speed to generate electric energy with an appropriate efficiency.

FIGS. 11 and 12 present more precisely the driving and PTO arrangement 5 of the wave energy recovery apparatus according to this embodiment of the invention. The driving and PTO arrangement 5 comprises the actuating mechanism 6 and one or more electric PTO units 7, in this example there are two PTO units 7 that are mutually similar and placed opposite to each other in the different sides of the panel 2 in the direction of the reciprocating motion of the panel 2. In addition to the lever mechanism 8 the actuating mechanism 6 comprises the rectilinear actuating rod 6a, which can be for instance a steel pipe with a strong wall.

Each pusher end 6e, 6f of the actuating rod 6a is closed into a guiding cylinder 13 that is fastened to the base 1 through support pedestals 13a. Both the ends of the actuating rod 6a are arranged to slide guided back and forth inside the guiding cylinders 13. The length of the guiding cylinders 13 is so dimensioned that the pusher ends 6e, 6f of the actuating rod 6a keep always inside the guiding cylinders 13 during the reciprocating linear motion of the actuating rod 6a. Thus, the length of the guiding cylinder 13 is greater than the reciprocating linear motion of the actuating rod 6a.

Before the removal of the electric PTO units 7 at least the end facing to the PTO unit 7 of each guiding cylinder 13 must be closed and sealed against seawater. That can be done for instance with a same kind of closing and sealing mechanisms 12 that are described in connection with FIGS. 7 and 8 above. Thus, the closing and sealing mechanism 12 can be for instance a gate valve, a spherical valve, another type of a valve, or the closing and sealing mechanism 12 can comprise a similar separate lockable closing and sealing part in the cylinder 6b in front of the pusher end 6e, 6f of the actuating rod 6a as is mentioned above in connection with the description of FIGS. 7 and 8. For the sake of clarity the closing and sealing mechanism 12 is not shown in FIGS. 9-11.

In the arrangement according to the invention the reciprocating motion of the panel 2 is transferred mechanically to a linear motion of the power transmission mechanism 6d, 9 of each PTO unit 7 through the mechanical intermediate mechanism between the panel 2 and the PTO units 7. In that case the reciprocating motion of the panel 2 is transferred first to the lever mechanism 8 and through the lever mechanism 8 to the actuating rod 6a that is guided to make a reciprocating linear motion in the rate of the reciprocating motion of the panel 2. When the capture of the wave energy is activated the actuating rod 6a is arranged to push the power transmission mechanism 6d, 9 of each PTO unit 7 in turns in order to produce a linear thrust motion for converting the wave energy to another type of energy.

When the PTO unit 7 needs maintenance or repairs the PTO unit 7 is removed or detached in its entirety from the wave energy recovery apparatus. In that case the part of the power transmission mechanism 6d, 9 that is inside the guiding cylinder 6b, 13 is at first moved out from the guiding cylinder 6b, 13 of the actuating rod 6a and after that the closing and sealing mechanism 12 for closing the open end of the guiding cylinder 6b, 13 is activated and the open end of the guiding cylinder 6b, 13 is water tightly closed. If needed, also the open end of the hydraulic cylinder 7a is water tightly closed with the closing and sealing mechanism 12, and the power transmission mechanism 6d, 9, such as the piston 9 is locked inside the hydraulic cylinder 7a, for instance by the hydraulic pressure of the hydraulic circuit 9b of the PTO unit 7. After that the PTO unit 7 is separated from the pedestals 7b and lifted up to the surface of the water.

The installation of the PTO unit 7 is made in an opposite order. At first the PTO unit 7 is descended onto the pedestals 7b and fastened at its place. After that the hydraulic cylinders 6b and 7a are fastened to each other and the closing and sealing mechanism 12 is opened, after which the power transmission mechanism 6d, 9, such as the piston 9 is unlocked inside the hydraulic cylinder 7a and the first end of the power transmission mechanism 6d, 9 is moved into the guiding cylinder 6b, 13 in a touching contact with the pusher end of the actuating rod 6a. After that the wave recovery apparatus is ready to operate.

The wave recovery apparatus according to the invention is easy and fast to protect against stormy conditions. When the storm protection is needed the power transmission mechanisms 6d, 9 of the PTO units 7 are mechanically separated from the guiding cylinders 6b, 13 basically in the same way as described above in connection of the removal of the PTO units 7. The only difference is that there is no need to remove the PTO units 7 from their pedestals 7b. When the first end of the power transmission mechanisms 6d, 9 is taken away from the guiding cylinders 6b, 13 and the open ends of the guiding cylinders 6b, 13 are closed the panel 2 and the actuating rod 6a may make their reciprocating motion freely without the risk that the structures of the wave recovery apparatus would suffer damages.

It is obvious to the person skilled in the art that the invention is not restricted to the examples described above but that it may be varied within the scope of the claims presented below. Thus, for example, the structure and positions of the actuating mechanism and lever mechanism can be different from what is presented.

It is also obvious to the person skilled in the art that the structure of the power-take-off machineries can differ from what is presented above. For instance the hydraulic cylinders of the PTO units can be used to convert the captured wave energy to pressurized seawater with a pressure between approximately 1-300 bar. That kind of pressurized water can be used as working medium for various tools us such, or for instance in devices for desalination purposes. In that case salt can be removed from the seawater using the reverse osmosis (RO) technology with a pressure between approximately 40-80 bar, or using the evaporation technology with a pressure between approximately 1-10 bar.

The invention claimed is:

1. An energy transfer arrangement of a wave energy recovery apparatus comprising:
   at least a base;
   a reciprocating panel receiving wave energy;
   a pivot shaft upon which the reciprocating panel pivots; and
   a driving and power-take-off arrangement including an actuating mechanism, the actuating mechanism including
      a rectilinear actuating rod, and
      one or more power-take-off (PTO) units to convert kinetic energy of waves or tidal currents to another type of energy, each PTO unit having
   a power transmission mechanism, connected to the actuating mechanism and configured to mechanically transfer the reciprocating motion of the panel to a linear motion of the power transmission mechanism of each PTO unit wherein each PTO units is removable and detachable from the actuating mechanism by detaching the power transmission mechanism of the PTO unit from the actuating rod of the actuating mechanism:
   wherein the rectilinear actuating rod includes two unfastened pusher ends, which actuating rod is connected through a coupling element of the panel and a lever mechanism to a lower part of the panel and arranged to make reciprocating linear motion caused by the reciprocating motion of the panel.

2. The energy transfer arrangement according to claim 1, wherein the lever mechanism includes,
   a pair of mutually similar coupling elements matching with the coupling elements of the panel,
   a pair of first lever arms and
   a pair of second lever arms connected mutually so that the pair of the coupling elements is fastened to a first end of the pair of the first lever arms that are pivoted at their second end to the first end of the pair of the second lever arms that are further pivoted at their second end to the actuating rod through a joint pin that is constantly fastened to the actuating rod, and that the pivot shaft is fitted through the central hole of the coupling elements.

3. The energy transfer arrangement according to claim 2, wherein the PTO units are mechanically separated from the pivot shaft and the panel, and the actuating rod of the actuating mechanism is connected to the pivot shaft or to the panel through the lever mechanism with at least two successive levers and having a pivot joint between the successive levers.

4. The energy transfer arrangement according to claim 2, wherein the actuating mechanism is arranged to act as a separate intermediate mechanism between the panel and the PTO units.

5. The energy transfer arrangement according to claim 1, wherein the actuating mechanism is arranged to act as a separate intermediate mechanism between the panel and the PTO units.

6. The energy transfer arrangement according to claim 1, wherein the arrangement comprises a closing and sealing mechanism that has been arranged to protect the pusher ends of the actuating rod, and the first end of the power transmission mechanism of each PTO unit from the seawater when the PTO units are detached from the actuating mechanism, or to protect the arrangement against stormy conditions.

7. The energy transfer arrangement according to claim 1, wherein the arrangement is equipped with a protection mechanism to protect the wave recovery apparatus against stormy conditions, the protection mechanism comprising at least a mechanism to move the first end of the power transmission mechanism out from the guiding cylinder of the actuating rod, and the closing and sealing mechanism for closing the open end of the guiding cylinder.

8. The energy transfer arrangement according to claim 1, wherein the pusher ends of the actuating rod are arranged to push the power transmission mechanism of the PTO units in turns so that when the first pusher end is pushing the power transmission mechanism of the first PTO unit the second pusher end is returning from pushing the power transmission mechanism of the second PTO unit; and vice versa.

9. The energy transfer arrangement according to claim 1, wherein the pusher ends of the actuating rod and the first end of each power transmission mechanism of the PTO units are mutually matched to each other and shaped so that the pushing force of the actuating rod is directed as rectilinearly as possible to the power transmission mechanism without causing any lateral forces.

10. The energy transfer arrangement according to claim 9, wherein the shape of the pusher end of the actuating rod is in the longitudinal direction of the actuating rod outwardly conical or spherical and correspondingly the first end of the power transmission mechanism is inwardly conical or spherical; or vice versa.

11. The energy transfer arrangement according to claim 1, wherein the PTO units are placed on the base a horizontal distance away from the pivot shaft of the panel either at both sides of the panel in the direction of the reciprocating motion of the panel or mutually at the same side of the panel in the direction of the reciprocating motion of the panel, either parallel to each other or one upon the other.

12. The energy transfer arrangement according to claim 1, wherein the pusher end of the actuating rod is arranged to make a reciprocating linear motion inside a guiding cylinder, and that the length of the guiding cylinder is greater than the reciprocating linear motion of the pusher end.

13. The energy transfer arrangement according to claim 1, wherein when capturing wave of tidal energy the first end of the power transmission mechanism is arranged to make a reciprocating linear motion inside a guiding cylinder.

14. The energy transfer arrangement according to claim 1, wherein the power transmission mechanism of the PTO units is a piston in a hydraulic cylinder.

15. The energy transfer arrangement according to claim 1, wherein the lever mechanism comprises a pair of mutually similar coupling elements matching with the coupling elements of the panel, a pair of the first lever arms and a pair of the second lever arms connected mutually so that the pair of the coupling elements is fastened to the first end of the pair of the first lever arms that are pivoted at their second end to the first end of the pair of the second lever arms that are further pivoted at their second end to the actuating rod through a joint pin that is constantly fastened to the actuating rod, and that the pivot shaft is fitted through the central hole of the coupling elements.

16. The energy transfer arrangement according to claim 1, wherein the PTO units are mechanically separated from the pivot shaft and the panel, and the actuating rod of the actuating mechanism is connected to the pivot shaft or to the panel through the lever mechanism with at least two successive levers and having a pivot joint between the successive levers.

17. The energy transfer arrangement according to claim 1, wherein the actuating mechanism is arranged to act as a separate intermediate mechanism between the panel and the PTO units.

18. The energy transfer arrangement according to claim 1, wherein the power transmission mechanism of the PTO units is a pinion rack meshing with gear wheels that are connected to generators to convert kinetic energy of waves or tidal currents to electric energy.

19. An energy transfer arrangement of a wave energy recovery apparatus comprising:
 at least a base;
 a reciprocating panel receiving wave energy;
 a pivot shaft upon which the reciprocating panel pivots; and
 a driving and power-take-off arrangement including an actuating mechanism, the actuating mechanism including
  a rectilinear actuating rod, and
  one or more power-take-off (PTO) units to convert kinetic energy of waves or tidal currents to another type of energy, each PTO unit having
 a power transmission mechanism, connected to the actuating mechanism and configured to mechanically transfer the reciprocating motion of the panel to a linear motion of the power transmission mechanism of each PTO unit wherein each PTO units is removable and detachable from the actuating mechanism by detaching the power transmission mechanism of the PTO unit from the actuating rod of the actuating mechanism;
 wherein the PTO units are mechanically separated from the pivot shaft and the panel, and the actuating rod of the actuating mechanism is connected to the pivot shaft or to the panel through a lever mechanism with at least two successive levers and having a pivot joint between the successive levers.

* * * * *